Dec. 9, 1930.  M. E. E. DARDANI  1,784,622
GASOLINE FILTER
Filed June 21, 1924

INVENTOR
Martin E. E. Dardani
BY
Arthur A. Johnson
his ATTORNEY

Patented Dec. 9, 1930

1,784,622

UNITED STATES PATENT OFFICE

MARTIN E. E. DARDANI, OF FAIRFIELD, CONNECTICUT, ASSIGNOR, BY MESNE ASSIGNMENTS, TO THE NEW ENGLAND FILTER CORPORATION, OF FAIRFIELD, CONNECTICUT, A CORPORATION OF CONNECTICUT

GASOLINE FILTER

Application filed June 21, 1924. Serial No. 721,416.

This invention provides means for separating from one liquid, foreign matter in the form of insoluble particles, or in the form of another liquid, and, in a more specific aspect, to a filter for removing from gasoline, grit and dirt and also water, which may be associated with the gasoline.

This means is particularly applicable to, and the disclosed embodiment is especially designed for use in connection with gasoline "filling stations" where it is embodied in and forms a part of the nozzle of the hose which leads from the pump and is inserted in the fuel-tank of automobiles. In this connection, a device of the present invention effectively clarifies gasoline passing through it from all foreign matter and separates from the stream, a substantial part of all the water which may be flowing with the gasoline. In fact, in some cases, no trace of water can be found in the gasoline flowing out of it, although the stream was known to contain water and water was caught by the filter.

The invention further provides an improved combined filter and nozzle which is efficient in operation, economically made and abuse-resisting.

The invention also provides a filter in which the residue remaining after a quantity of gasoline has been filtered can be viewed. This arrangement allows the dispenser to determine the quality of the fuel which he is selling and also, in case an excessive amount of water is found to exist, to determine this fact, so that proper steps may be taken to remove the condition. By exposing the residue to view, it is also possible to determine when the filter should be cleaned.

The invention also provides a filter in which a minimum quantity of gasoline is retained by the filter, after each filtering operation.

Other features and advantages will hereinafter appear.

In the accompanying drawings.

Figure 1:
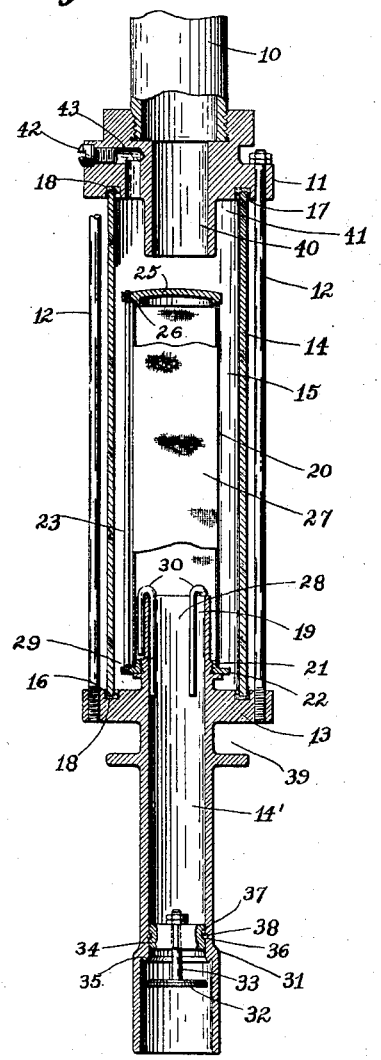
Figure 1 is a longitudinal sectional view showing a device made in accordance with the present invention.

In the embodiment of the invention, selected for the purpose of illustration, the hose 10 which is connected to the pump of the gasoline "filling station" is provided with a threaded end adapted to be screwed into a disk or end 11 forming part of the combined filter and nozzle. The end 11 is connected by tie-rods 12 to a lower disk 13 formed integral with or detachably connected to a nozzle 14' which is adapted to be inserted in the fuel-tank of an automobile.

The upper disk 11 and lower disk 13 have provided between them, a cylinder 14 forming a chamber 15 inside of which is provided the filtering device. The cylinder 14 is preferably made of glass so that a customer may have no suspicion that the chamber is a trap to retain a portion of the gasoline which he is paying for, and so that the user of the device, because of the fact that the customer can inspect the operation of the filter, may demonstrate to the customer, the extra service given by filtering the gasoline before it enters the fuel-tank of the customer's automobile.

The glass cylinder 14 is preferably located in a face-groove 16 in the disk 13 and in a similar groove 17 in the disk 11, gaskets 18 being provided in the bottoms of said grooves to form a liquid-tight joint.

It should be noted that the glass cylinder 14 is located inside of the tie-rods 12, and that the latter form a guard to protect the glass cylinder against breakage.

Within the chamber 15 is provided by the cylinder 14 and caps 11 and 13, the cap 13 being provided with an upwardly extending tube 19 adapted to receive and support the lower end of a filtering screen 20 arranged in tubular form and extending upwardly in the chamber 15, as shown in the drawing. The lower end of the screen 20, instead of being directly mounted on the tube 19, is preferably secured to a flange 21 provided upon a nut 22 engaging a threaded portion of the tube 19. This nut 22 is provided with upwardly extending rods 23 which are connected to arms 24 of a cap 25 having a flanged portion 26 adapted to receive the upper end of the screen 20 to close the same at the top.

This arrangement allows the screen 20 with its cap 25 and bottom support 22 to be assembled completely before it is attached to other parts of the device. In passing, it may be said that the tube 19 may be formed integral with the disk 13, as shown in the drawing, or it may be a separate part. The former, however, is a more advantageous construction in that the cost of manufacture is materially reduced by this form.

It will be seen that the chamber 15 is divided by the screen 20 so that there is an auxiliary chamber 27 within this screen. This auxiliary chamber 27 is connected by a hole 28 through the disk 13 and the tube 19 to the nozzle 14′ through which the gasoline passes after being filtered through the screen 20.

Figure 2:
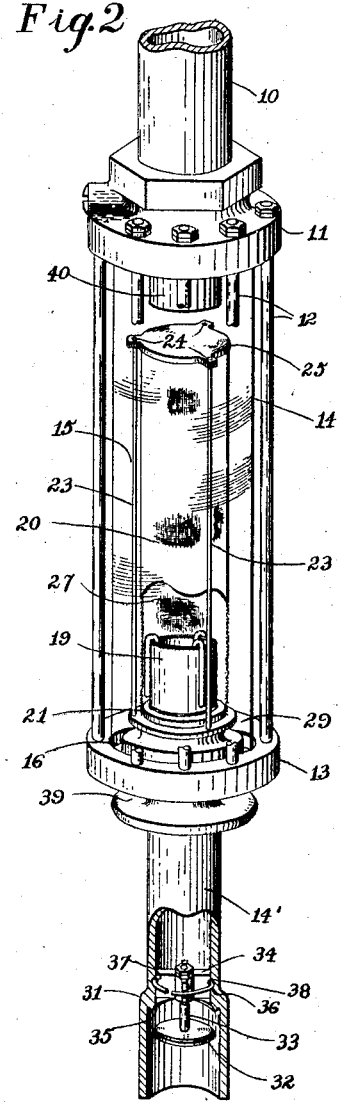
Fig. 2 is a perspective view of the device shown in Fig. 1.

In operation, as soon as the gasoline is pumped to the device, through the hose 10, the chamber 15 fills with gasoline and the gasoline flows through the screen 20 into the chamber 27 while the foreign matter is retained in the outside portion of the chamber 15. The gasoline which flows through the screen 20 then flows down through the tube 19 and the opening 28 in the disk 13 to the nozzle 14′ where it passes into the fuel-tank. In this operation, the solid particles of foreign matter are accumulated upon the surface of the screen. After the pumping has ceased, these solid particles fall off the screen and into the bottom portion 29 of the chamber 15. To allow the accumulation of foreign matter at this bottom portion 29, without the danger of its filling the screen and being forced through the screen by the pressure of the gasoline, the screen 20 is so arranged upon the tube 19 as to be spaced from the upper face of the disk 13 as shown in Figs. 1 and 2. Further, in order to avoid the danger of the solid particles being forced through the screen at the bottom portion of the device where they will be accumulated, the tube 19 is extended partly up into the chamber 27 within the screen 20 as shown in the drawing, so that substantially all the flow of gasoline through the filter during the major portion of the filtering operation is through that part of the screen above the level of the tube 19.

By extending the tube 19 upwardly into the chamber 27, and the chamber 15 which embraces the chamber 27, a pocket is provided which tends to retain a certain quantity of gasoline at each filling operation. Ordinarily, this is undesirable because the customer does not appear to receive all of the gasoline for which he has paid and because it might be dangerous to expose this quantity of gasoline contained within the chamber 15. To avoid this, the present invention provides a siphon 30, or a plurality of siphons 30 in the chamber 27, which lead from the bottom of the chamber 27 over the top of the tube 19 and down into the opening 28 in the tube and disk. These siphons draw off the gasoline remaining in the filter to the line defined by the bottom of the strainer and thus only a slight quantity of liquid is allowed to remain in the chamber 15, while the chamber 27 is drained entirely. The siphon 30 may be, as shown in the drawings, in the form of a tube or tubes extending over the end of the tube 19 or it may be formed as part of the tube 19, as desired.

The lower end of the nozzle 14′ is flared outwardly at 31 to provide a shoulder to assist in holding the nozzle in the fuel-tank. At the inside portion of the nozzle 14′, at this point, there is provided a valve 32 mounted on a stem 33 in a spider 34 arranged within the nozzle 14′. As the nozzle is turned upwardly where it might catch rain, or other foreign matter, the valve 32 seats itself upon a valve seat 35 provided for the purpose and closes the passage through the nozzle. The spider 34 may be secured in the nozzle 14′ in any suitable manner, but preferably it is held in place by a spring clamping device comprising a split spring-ring 36 adapted to be contained within a groove 37 in spider arms when the device is being assembled and adapted to spring outwardly when the spider is in properly adjusted position to partially enter a circumferential internal groove 38 provided in the wall of the nozzle 14′. This arrangement securely holds the spider and valve in place and allows the parts to be removed upon the application of sufficient force, but holds them firmly in place against accidental displacement.

The cap 13 may be provided with a circumferential groove 39 adapted to receive the hook upon which the nozzle is supported on the pump when out of use.

When the nozzle is turned upwardly to be hung upon the hook provided on the pump to receive it, the foreign matter contained in the bottom portion 29 of the chamber may fall so that it rests upon the disk 11. To prevent this from entering the hose 10 the disk 11 is provided with a downwardly extending tubular portion 40 providing thereby a pocket 41 to receive such matter that might fall.

To clean the filter, a plug 42, closing an opening 43 leading to the pocket 41, is removed and the foreign substances, grit, dirt and water, collected by the device, are allowed to fall or are washed out of the chamber 15 through the opening 43.

The screen 23, it has been found, when made of fine mesh wire, 180 mesh to the inch having been found serviceable for the purpose, water carried in the stream with the gasoline is arrested by the screen. It has been found that water will not readily, if at all, pass through a screen of this fineness whereas gasoline will. While water will readily pass through a screen of this fineness if both sides of the screen are wet with water, this will not occur if the screen is wet with gasoline. The discovery of this fact has made it possible to efficiently separate gasoline and water by a simple straining process.

While one form of this invention has been herein disclosed, it should be distinctly understood that other forms will suggest themselves to those skilled in the art, and that variations and modifications may also be made within the scope of this invention, and that portions of the improvements may be used without others.

What is claimed as new, and for which it is desired to obtain Letters Patent, is:—

1. A device of the character described, comprising an enclosed chamber; a filter device located in the chamber; a pocket in the chamber located between the bottom of the chamber and the bottom of the filter device; an outlet for the chamber having an orifice located in elevated relation with respect to the lower end of said filter device; and a siphon having a receiving-end between the filter device and said outlet and having a discharge-end within the outlet and below the level of the filter device.

2. A device of the character described comprising an enclosed chamber; a filtering device located in the chamber; an outlet having a receiving orifice located between the ends of the chamber; and a siphon adapted to carry from the chamber a portion of the filtrate remaining in it and located below the level of the said receiving orifice of the outlet.

Signed at Bridgeport, in the county of Fairfield, and State of Connecticut, this 19 day of June, 1924.

MARTIN E. E. DARDANI.